(12) United States Patent
Sugamura (10) Patent No.: US 8,045,338 B2
(45) Date of Patent: Oct. 25, 2011

(54) STRUCTURE FOR MOUNTING INDICATOR UNIT ON ELECTRONIC APPARATUS

(75) Inventor: Tomokazu Sugamura, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 645 days.

(21) Appl. No.: 12/179,282

(22) Filed: Jul. 24, 2008

(65) Prior Publication Data

US 2009/0027868 A1    Jan. 29, 2009

(30) Foreign Application Priority Data

Jul. 25, 2007   (JP) ................................ 2007-192838

(51) Int. Cl.
*H05K 7/02* (2006.01)
*H05K 7/04* (2006.01)
(52) U.S. Cl. .................... 361/807; 361/810; 361/749
(58) Field of Classification Search .................. 361/600,
361/679.01, 748–749, 807, 810; 362/800,
362/191, 157, 190; 348/61, 125, 131; 359/642,
359/811, 819, 822–824, 542, 439
See application file for complete search history.

(56) References Cited

U.S. PATENT DOCUMENTS

| | | | |
|---|---|---|---|
| 4,214,391 A | | 7/1980 | Angst |
| 5,632,551 A | * | 5/1997 | Roney et al. .................. 362/485 |
| 5,934,798 A | * | 8/1999 | Roller et al. .................. 362/497 |
| 6,015,223 A | | 1/2000 | Kidd et al. |
| 6,347,880 B1 | * | 2/2002 | Furst et al. ..................... 362/494 |
| 7,040,779 B2 | * | 5/2006 | Lamke et al. ................. 362/231 |
| 7,210,963 B2 | * | 5/2007 | Chintala et al. ............... 439/594 |
| 2006/0077650 A1 | | 4/2006 | Schmidt et al. |
| 2009/0067181 A1 | | 3/2009 | Ciupka |

FOREIGN PATENT DOCUMENTS

| | | |
|---|---|---|
| DE | 20 2007 012 474 U1 | 12/2007 |
| JP | 62-219597 A | 9/1987 |
| JP | 2005-5374 A | 1/2005 |
| JP | 2007-116556 A | 5/2007 |

OTHER PUBLICATIONS

The Extended European Search Report dated Dec. 9, 2009 (Six (6) pages).

* cited by examiner

*Primary Examiner* — Hung S Bui
(74) *Attorney, Agent, or Firm* — Crowell & Moring LLP (57) ABSTRACT

This structure for mounting an indicator unit on an electronic apparatus includes an indicator unit including a wiring board and a lens member having a first pressing portion pressing a first surface of the wiring board and a housing of an electronic apparatus, mounted with the indicator unit, including a second pressing portion pressing a second surface of the wiring board. The wiring board is so held between the first pressing portion of the lens member and the second pressing portion of the housing as to be fixed.

17 Claims, 8 Drawing Sheets

STRUCTURE FOR MOUNTING INDICATOR UNIT ON ELECTRONIC APPARATUS

BACKGROUND OF THE INVENTION

1. Field of the Invention

The present invention relates to a structure for mounting an indicator unit on an electronic apparatus, and more particularly, it relates to a structure for mounting an indicator unit including a wiring board on an electronic apparatus.

2. Description of the Background Art

A turning apparatus comprising a rotating member rotatable in a horizontal plane is known in general, as disclosed in each of Japanese Patent Laying-Open Nos. 62-219597 (1987), 2005-5374 and 2007-116556, for example.

The aforementioned Japanese Patent Laying-Open No. 62-219597 discloses a structure for mounting a board (wiring board) on a panel (housing). In this mounting structure, two pairs of protrusions vertically separating from each other are provided on a surface of the panel mounted with the board at a prescribed interval in the width direction. These protrusions have pin receiving holes vertically passing therethrough, so that two pins can be inserted into each vertical pair of protrusions respectively. The board is so shaped that the same is width-directionally grasped by the protrusions separating from each other in the width direction and vertically grasped by the protrusions vertically separating from each other. When mounted on the panel, the board is fitted into the spaces between the vertically separating protrusions and the width-directionally separating protrusions, to be grasped by the protrusions. In this state, the pins are inserted into the pin receiving holes, so that the board is mounted on the panel without screw members.

The aforementioned Japanese Patent Laying-Open No. 2005-5374 discloses a structure for mounting a board (wiring board) on a deck body (electronic apparatus) which is an apparatus body. This mounting structure is provided with a pair of inverted F-shaped mounting legs downwardly opposed to each other from the lower surface of the deck body. The inverted F-shaped mounting legs have lower stop sections provided on the lower ends thereof and protruding sections provided above the lower ends. The board mounted on the deck body is provided with mounting holes capable of receiving the lower stop sections of the mounting legs on positions corresponding to the mounting legs. The lower stop sections of the pair of mounting legs of the deck body are inserted into the pair of mounting holes of the board so that the lower stop sections and the protruding sections of the deck body hold the board therebetween, whereby the board is mounted on the deck body without screw members.

The aforementioned Japanese Patent Laying-Open No. 2007-116556 discloses a structure for mounting a digital board (wiring board) on a panel fixing metal sheet for fixing an image display panel. In this mounting structure, the panel fixing metal sheet is provided with two pairs of folded sections formed by partially uprightly folding the same on positions separating from each other in the width direction. On both surfaces of the digital board, solder heaps are provided on positions corresponding to the folded sections of the panel fixing metal sheet mounted with the digital board. The digital board is slid into the two pairs of folded sections of the panel fixing metal sheet to be held by the panel fixing metal sheet and the folded sections and fixed through the solder heaps, provided on both surfaces thereof, coming into contact with the panel fixing metal sheet and the folded sections. Thus, the digital board is mounted on the panel fixing metal sheet without screw members.

In the mounting structure described in the aforementioned Japanese Patent Laying-Open No. 62-219597, however, the board can be fixed to the panel without screw members, while the pins are required in order to fix the board to the panel. Therefore, the number of components is disadvantageously increased.

When an indicator unit is mounted on the deck body with the mounting structure described in the aforementioned Japanese Patent Laying-Open No. 2005-5374, on the other hand, a lens member must be fixed independently of the wiring board fixed to the deck body. When the wiring board and the lens member are separately fixed in this manner, it is disadvantageously difficult to correctly keep the positional relation between a light source portion mounted on the wiring board and the lens member.

When an indicator unit is mounted on the panel fixing metal sheet with the mounting structure described in the aforementioned Japanese Patent Laying-Open No. 2007-116556, a lens member must be fixed independently of the wiring board fixed to the panel fixing metal sheet. When the wiring board and the lens member are separately fixed in this manner, it is disadvantageously difficult to correctly keep the positional relation between a light source portion mounted on the wiring board and the lens member.

SUMMARY OF THE INVENTION

The present invention has been proposed in order to solve the aforementioned problems, and an object of the present invention is to provide a structure for mounting an indicator unit on an electronic apparatus capable of correctly keeping the positional relation between a light source portion of a wiring board and a lens member while suppressing increase in the number of components, with no requirement for dedicated screw members for fixing the wiring board.

A structure for mounting an indicator unit on an electronic apparatus according to a first aspect of the present invention comprises an indicator unit including a wiring board mounted with a light source portion and a lens member transmitting light from the light source portion and a housing of an electronic apparatus mounted with the indicator unit. The lens member has a first pressing portion pressing a first surface of the wiring board toward a first direction, the housing includes a second pressing portion pressing a second surface of the wiring board toward a second direction opposite to the first direction, and the wiring board is fixed by mounting the lens member on the housing so that the wiring board is held between the first pressing portion of the lens member and the second pressing portion of the housing while the light source portion of the wiring board is positioned with respect to the lens member.

In the structure for mounting an indicator unit on an electronic apparatus according to the first aspect, as hereinabove described, the lens member is so mounted on the housing that the first pressing portion of the lens member presses the first surface of the wiring board in the first direction and the second pressing portion of the housing presses the second surface of the wiring board in the second direction to hold and fix the wiring board of the indicator unit so that the wiring board can be mounted on the housing without dedicated screw members for fixing the wiring board, whereby the number of components can be reduced. Further, the wiring board is held and fixed by the first pressing portion of the lens member and the second pressing portion of the housing while the light source portion of the wiring board is positioned with respect to the lens member, whereby the wiring board can be fixed while correctly keeping the positional relation between the lens member and the light source portion of the wiring board. Thus, the display performance of the indicator unit can be prevented from reduction resulting from positional deviation between the light source portion and the lens member.

In the aforementioned structure for mounting an indicator unit on an electronic apparatus according to the first aspect, the second pressing portion of the housing is preferably constituted of a rib integrally formed on the housing. According to this structure, the number of components can be reduced as compared with a case of providing the second pressing portion separately from the housing.

In this case, the lens member preferably has a transmitting portion for transmitting the light from the light source portion, and the rib constituting the second pressing portion of the housing is preferably arranged on a position not overlapping the transmitting portion in front elevational view. According to this structure, the rib constituting the second pressing portion of the housing can be inhibited from blocking the light from the light source portion when the same is transmitted through the transmitting portion of the lens member. Thus, the display performance of the indicator unit for the light received from the light source portion can be prevented from reduction resulting from the rib constituting the second pressing portion.

In the aforementioned structure for mounting an indicator unit on an electronic apparatus provided with the housing having the second pressing portion constituted of the rib, the rib constituting the second pressing portion of the housing is preferably L-shaped in front elevational view, and so arranged as to press two sides around corners of the wiring board. According to this structure, the wiring board can be more stably fixed with the L-shaped rib pressing the two sides of the wiring board. Further, the rib constituting the second pressing portion is so formed as to press portions around the corners of the wiring board, thereby pressing the wiring board on positions avoiding wires etc. of the wiring board.

In the aforementioned structure for mounting an indicator unit on an electronic apparatus according to the first aspect, the first pressing portion of the lens member is preferably provided with a first boss for regulating the position of the wiring board, the wiring board preferably has a first boss receiving hole for receiving the first boss of the lens member, and the light source portion of the wiring board is preferably positioned with respect to the lens member by inserting the first boss of the lens member into the first boss receiving hole of the wiring board. According to this structure, the wiring board can be fixed while positioning the light source portion of the wiring board with respect to the lens member.

In the aforementioned structure for mounting an indicator unit on an electronic apparatus according to the first aspect, the housing preferably further includes a mounting portion for mounting the lens member, the mounting portion of the housing preferably has a second boss for regulating the position of the lens member, and the lens member preferably has a second boss receiving hole receiving the second boss of the mounting portion of the housing. According to this structure, the lens member can be easily positioned with respect to the housing by inserting the second boss of the mounting portion of the housing into the second boss receiving hole of the lens member. Thus, the operation of mounting the lens member on the housing can be prevented from complication.

In the aforementioned structure for mounting an indicator unit on an electronic apparatus provided with the housing including the mounting portion, the mounting portion of the housing preferably further has a threaded hole, and the lens member is preferably mounted on the housing by clamping a screw member to the threaded hole of the housing while inserting the second boss of the mounting portion of the housing into the second boss receiving hole of the lens member. According to this structure, the lens member can be firmly fixed to the housing with the screw member while positioning the lens member with respect to the housing through the second boss receiving hole of the lens member and the second boss of the mounting portion of the housing.

In the aforementioned structure for mounting an indicator unit on an electronic apparatus provided with the rib pressing the two sides around the corners of the wiring board, the first pressing portion of the lens member is preferably so formed as to press regions corresponding to portions around the corners of the wiring board pressed by the L-shaped rib of the housing. According to this structure, portions around two corners of the wiring board can be held by the first pressing portion of the lens member and the rib of the housing, whereby the wiring board can be fixed in a stable state.

In the aforementioned structure for mounting an indicator unit on an electronic apparatus provided with the lens member having the transmitting portion, a pair of first pressing portions of the lens member are preferably provided on right and left portions through the transmitting portion. According to this structure, the pair of pressing portions of the lens member can press two horizontally separating portions of the wiring board, whereby the wiring board can be fixed in a more stable state.

In this case, a pair of ribs are preferably provided on positions corresponding to the pair of first pressing portions, and the wiring board is preferably so held between the pair of first pressing portions and the pair of ribs as to be fixed. According to this structure, the two first pressing portions and the two ribs hold the wiring board therebetween, whereby the wiring board can be fixed in a more stable state.

In the aforementioned structure for mounting an indicator unit on an electronic apparatus provided with the housing having the pair of ribs, the pair of ribs preferably have horizontally symmetrical L shapes in front elevational view, and are preferably so formed as to press two sides around the right and left corners of the wiring board respectively. According to this structure, the pair of ribs can press the two sides around the corners located on the right and left sides respectively, whereby the wiring board can be fixed in a more stable state.

In the aforementioned structure for mounting an indicator unit on an electronic apparatus provided with the lens member having the pair of first pressing portions, the lens member preferably further includes a pair of legs so integrally formed as to extend downward from both horizontal ends of the transmitting portion, and the pair of first pressing portions are preferably integrally formed on the pair of legs respectively. According to this structure, the transmitting portion, the pair of legs and the pair of first pressing portions of the lens member can be integrally formed, whereby the number of components can be reduced as compared with a case of providing the transmitting portion and the pair of first pressing portions separately from each other.

In this case, the housing preferably further includes a pair of mounting portions for mounting the lens member, and the lens member preferably further includes a pair of lens-side mounting portions mounted on the pair of mounting portions of the housing and integrally formed on the pair of legs. According to this structure, the transmitting portion, the pair of legs and the pair of lens-side mounting portions of the lens member can be integrally formed, whereby the number of components can be reduced as compared with the case of providing the transmitting portion and the pair of lens-side mounting portions separately from each other.

In the aforementioned structure for mounting an indicator unit on an electronic apparatus provided with the lens member including the pair of lens-side mounting portions, the pair of lens-side mounting portions of the lens member are preferably so formed as to protrude oppositely to the first direction with respect to the surfaces of the pair of legs, and the pair of first pressing portions are preferably formed on positions separating from the lens-side mounting portions of the leg at a prescribed interval in the first direction. According to this structure, the first pressing portions pressing the wiring board and the lens-side mounting portions for mounting the lens member on the housing can be arranged on positions separating from each other, whereby the wiring board pressed by the first pressing portions and the lens-side mounting portions can be inhibited from interfering with each other.

In the aforementioned structure for mounting an indicator unit on an electronic apparatus according to the first aspect, the electronic apparatus is preferably a television set integrally including a disk unit, and the indicator unit is mounted on the housing of the television set, and employed as an indicator of the disk unit. When the present invention is applied to the indicator unit of the television set integrally comprising a disk unit, the positional relation between the light source portion of the wiring board and the lens member is correctly kept when the indicator unit is mounted on the housing of the television set, whereby the display performance of the disk unit serving as an indicator can be prevented from reduction.

A television set according to a second aspect of the present invention comprises a display portion displaying images, an indicator unit including a wiring board mounted with a light source portion and a lens member transmitting light from the light source portion and a housing mounted with the indicator unit, while the lens member has a first pressing portion pressing a first surface of the wiring board toward a first direction, the housing includes a second pressing portion pressing a second surface of the wiring board toward a second direction opposite to the first direction, and the wiring board is fixed by mounting the lens member on the housing so that the wiring board is held between the first pressing portion of the lens member and the second pressing portion of the housing while the light source portion of the wiring board is positioned with respect to the lens member.

In the television set according to the second aspect of the present invention, as hereinabove described, the lens member is so mounted on the housing that the first pressing portion of the lens member presses the first surface of the wiring board in the first direction and the second pressing portion of the housing presses the second surface of the wiring board in the second direction to hold and fix the wiring board of the indicator unit so that the wiring board can be mounted on the housing without dedicated screw members for fixing the wiring board, whereby the number of components can be reduced. Further, the wiring board is held and fixed by the first pressing portion of the lens member and the second pressing portion of the housing while the light source portion of the wiring board is positioned with respect to the lens member, whereby the wiring board can be fixed while correctly keeping the positional relation between the lens member and the light source portion of the wiring board. Thus, the display performance of the indicator unit can be prevented from reduction resulting from positional deviation between the light source portion and the lens member.

In the aforementioned television set according to the second aspect, the second pressing portion of the housing is preferably constituted of a rib integrally formed on the housing. According to this structure, the number of components can be reduced as compared with a case of providing the second pressing portion separately from the housing.

In this case, the lens member preferably has a transmitting portion for transmitting the light from the light source portion, and the rib constituting the second pressing portion of the housing is preferably arranged on a position not overlapping the transmitting portion in front elevational view. According to this structure, the rib constituting the second pressing portion of the housing can be inhibited from blocking the light from the light source portion when the same is transmitted through the transmitting portion of the lens member. Thus, the display performance of the indicator unit for the light received from the light source portion can be prevented from reduction resulting from the rib constituting the second pressing portion.

In the aforementioned television set provided with the housing having the second pressing portion constituted of the rib, the rib constituting the second pressing portion of the housing is preferably L-shaped in front elevational view, and so arranged as to press two sides around corners of the wiring board. According to this structure, the wiring board can be more stably fixed with the L-shaped rib pressing the two sides of the wiring board. Further, the rib constituting the second pressing portion is so formed as to press portions around the corners of the wiring board, thereby pressing the wiring board on positions avoiding wires etc. of the wiring board.

In this case, the first pressing portion of the lens member is preferably so formed as to press regions corresponding to portions around the corners of the wiring board pressed by the L-shaped rib of the housing. According to this structure, portions around two corners of the wiring board can be held by the first pressing portion of the lens member and the rib of the housing, whereby the wiring board can be fixed in a stable state.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

First, the structure of a television set 1 with a disk unit comprising an indicator unit 10 according to an embodiment of the present invention is described with reference to FIG. 1 to 10. This embodiment of the present invention is applied to the television set 1 with a disk unit employed as an exemplary television set.

Figure 1:
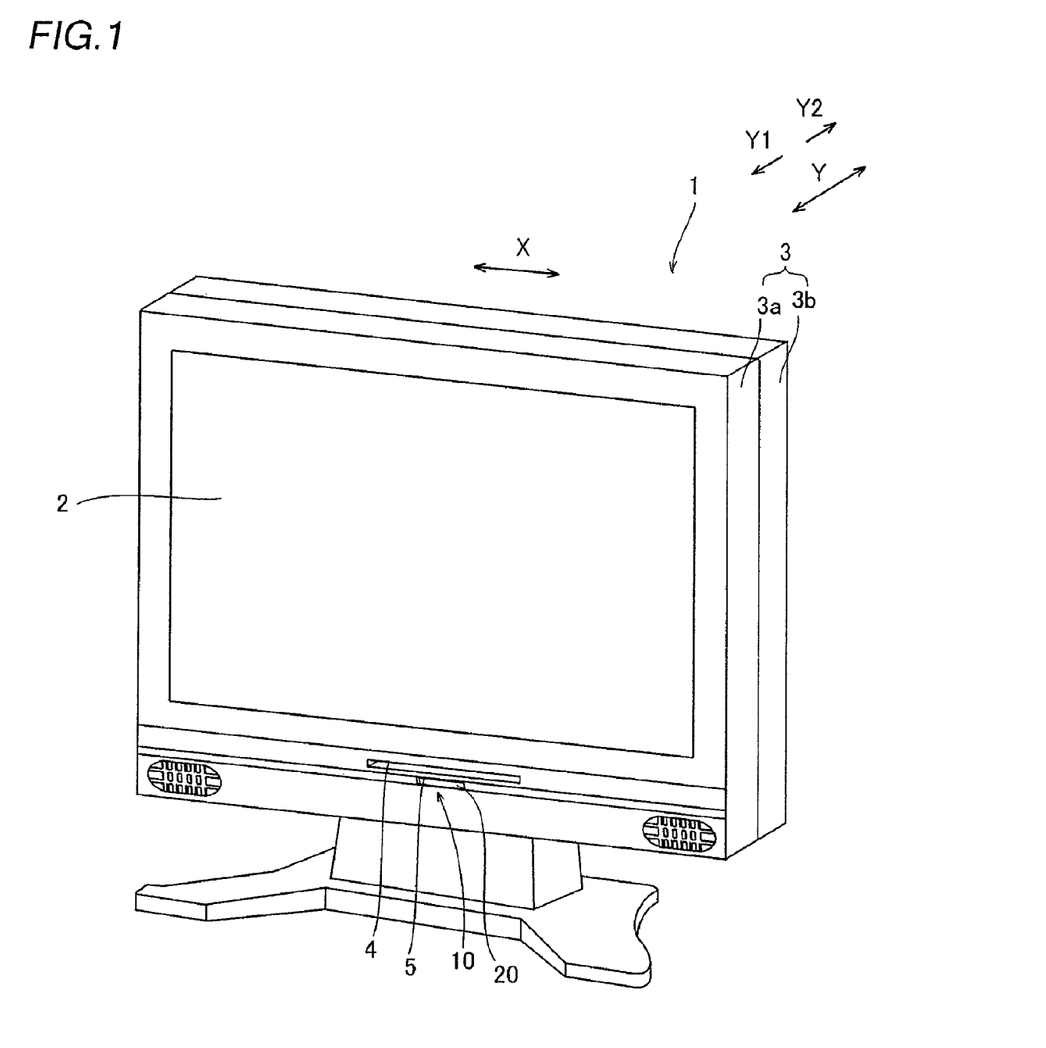
FIG. 1 is a perspective view showing the overall structure of a television set with a disk unit comprising an indicator unit according to an embodiment of the present invention.
Figure 2:
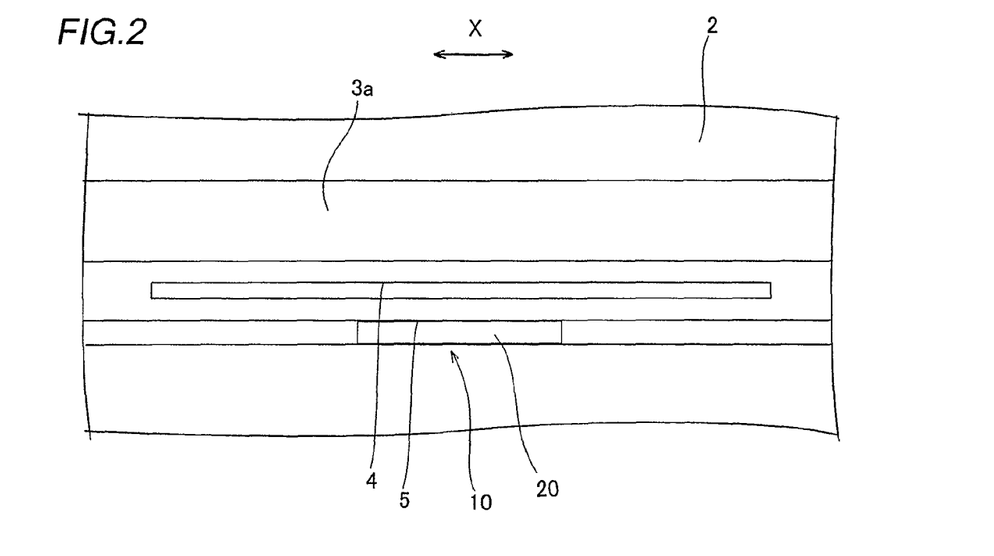
FIG. 2 is an enlarged front elevational view showing the structure of a portion around the indicator unit of the television set with a disk unit according to the embodiment of the present invention.

The television set 1 with a disk unit according to the embodiment of the present invention comprises a liquid crystal panel 2 for displaying images, as shown in FIG. 1. The liquid crystal panel 2 is an example of the "display portion" in the present invention. The liquid crystal panel 2 is supported by a housing 3 constituted of a front housing 3a and a rear housing 3b. The front housing 3a has a disk slot 4 provided under the liquid crystal panel 2 for receiving a disk and a display portion slot 5 provided under the disk slot 4 for receiving a display portion 20 of the indicator unit 10 described later, as shown in FIGS. 1 and 2.

Figure 3:
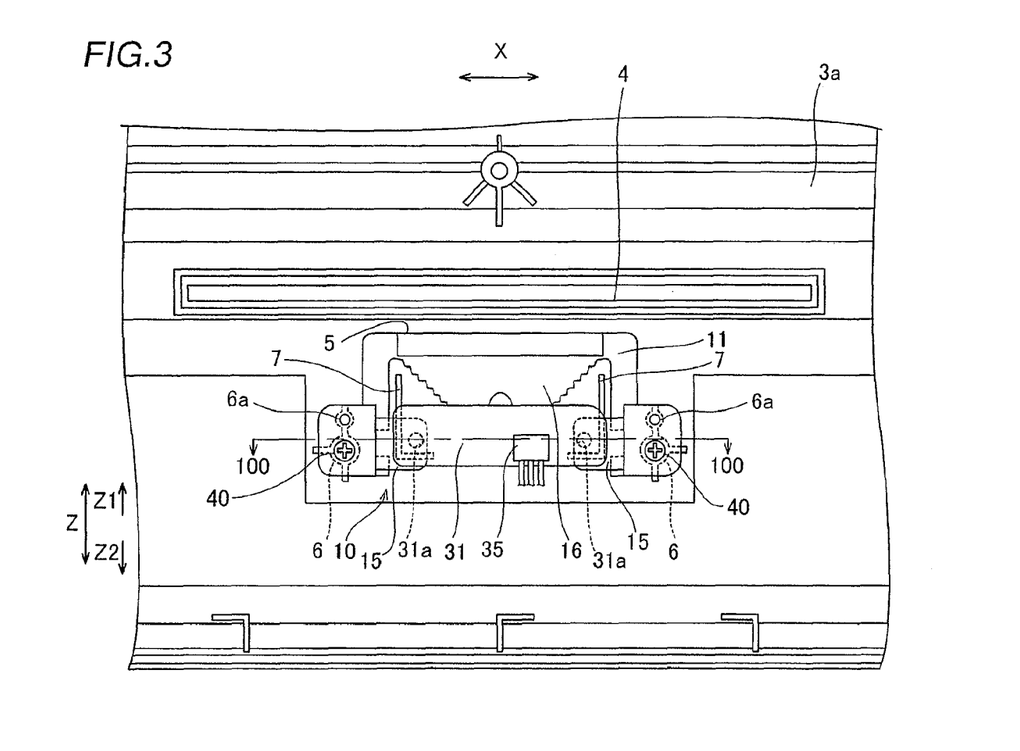
FIG. 3 is a rear elevational view of a front housing and the indicator unit of the television set with a disk unit according to the embodiment shown in FIG. 1.

As shown in FIG. 3, the indicator unit 10 for displaying light from a light-emitting diode (hereinafter referred to as an LED) 32 (see FIG. 8) described later is provided on the rear surface of the front housing 3a. This indicator unit 10 includes a lens 11, integrally molded by translucent resin, having the display portion 20 (see FIG. 2) inserted into the display portion slot 5, the LED 32 and a wiring board 31 mounted with the LED 32 (see FIG. 8). The lens 11 is an example of the "lens member" in the present invention.

Figure 4:
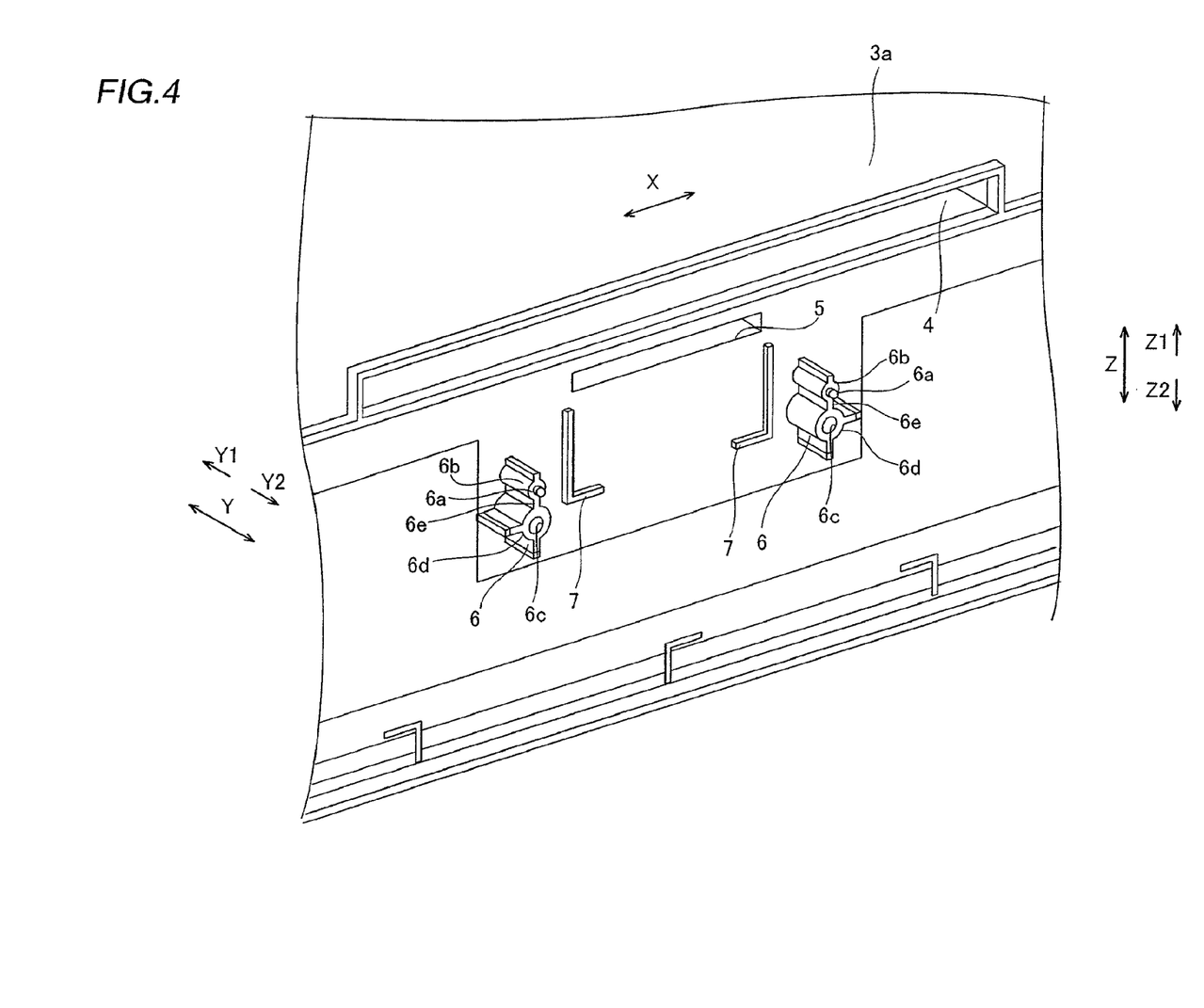
FIG. 4 is a perspective view showing the structure of the rear surface of the front housing according to the embodiment shown in FIG. 3.

According to this embodiment, a pair of housing-side mounting portions 6 for mounting the lens 11 (see FIG. 3) on the front housing 3a are provided on the rear surface of the front housing 3a at a prescribed interval in a direction X, as shown in FIGS. 3 and 4. As shown in FIG. 4, the pair of housing-side mounting portions 6 are constituted of columnar upper mounting portions 6b, formed on upper portions, having housing-side bosses 6a, columnar lower mounting portions 6d, formed on lower portions, having threaded holes 6c and connecting portions 6e connecting the upper mounting portions 6b and the lower mounting portions 6d with each other. The housing-side bosses 6a of the pair of upper mounting portions 6b are provided for regulating the position of the lens 11 (see FIG. 3), while the threaded holes 6c of the lower mounting portions 6d are provided for mounting the lens 11 (see FIG. 3). The housing-side mounting portions 6 are examples of the "mounting portion" in the present invention, and the housing-side bosses 6a are examples of the "second boss" in the present invention. The threaded holes 6c are examples of the "threaded hole" in the present invention.

According to this embodiment, a pair of ribs 7 are integrally formed on the rear surface of the front housing 3a on positions separating from each other by a prescribed distance in the direction X, as shown in FIGS. 3 and 4. These ribs 7 have L-shapes, in order to come into contact with portions around both corners on the lower side (along arrow Z2 in FIG. 3) of the wiring board 31 (see FIG. 3) and press the width-directional sides (along the direction X) and the lower side of the wiring board 31 (see FIG. 3). The ribs 7 are examples of the "second pressing portion" in the present invention.

Figure 5:
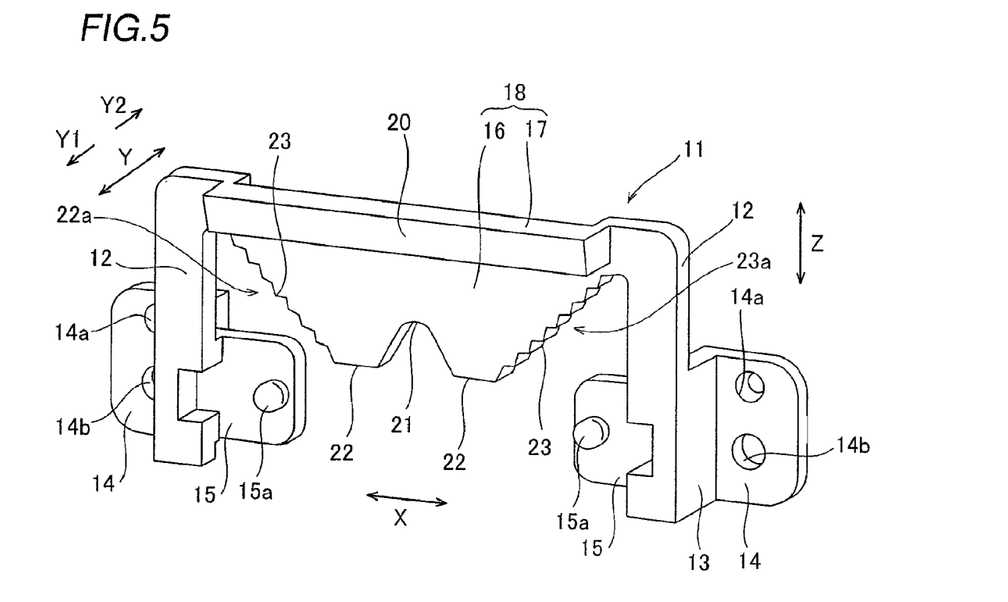
FIG. 5 is a perspective view showing the structure of a lens of the indicator unit according to the embodiment shown in FIG. 3.
Figure 6:
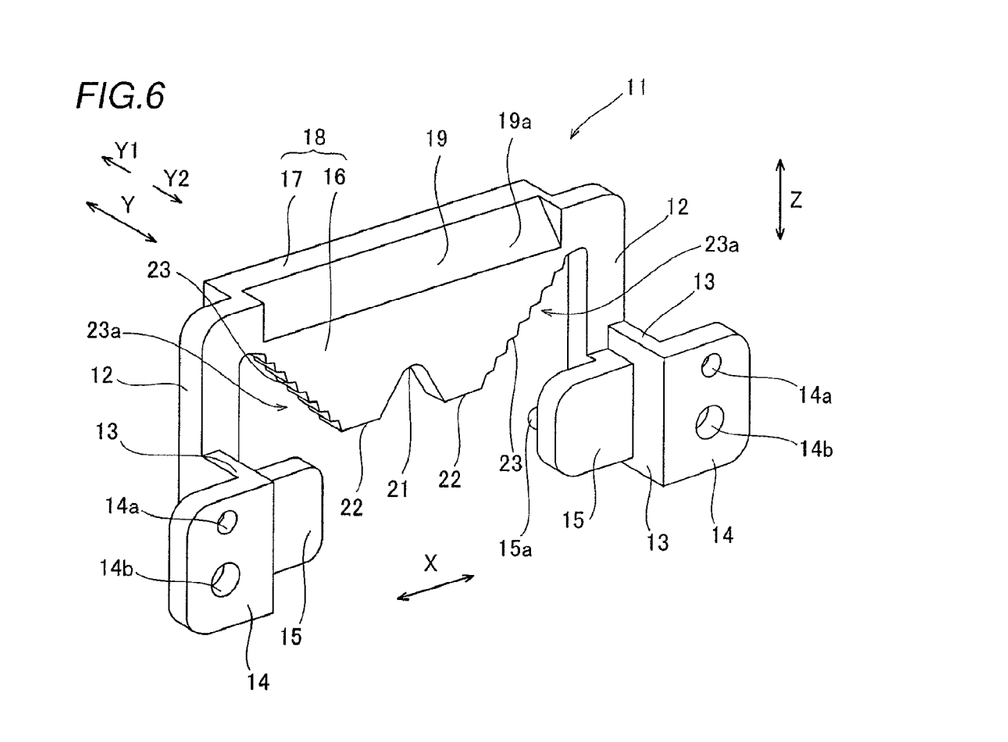
FIG. 6 is a perspective view showing the structure of the lens of the indicator unit according to the embodiment shown in FIG. 3.
Figure 7:
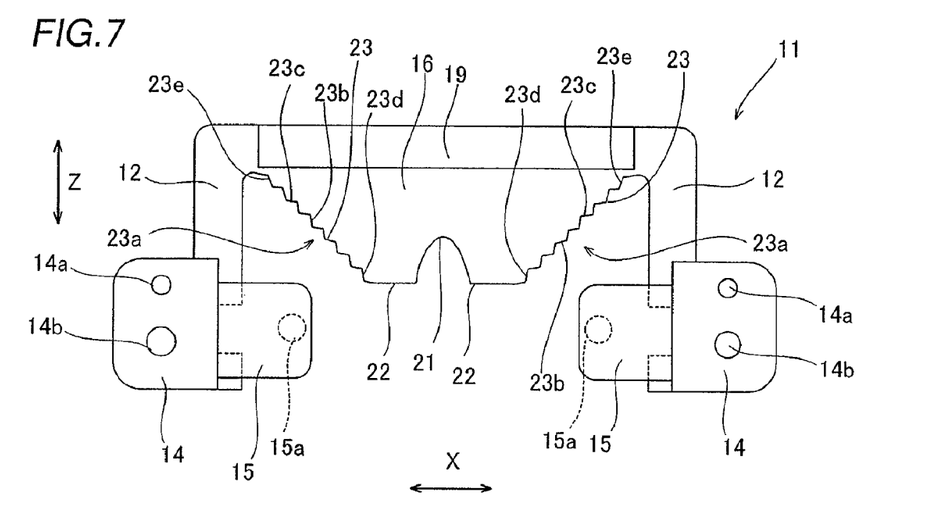
FIG. 7 is a rear elevational view showing the structure of the lens of the indicator unit according to the embodiment shown in FIG. 3.

As shown in FIGS. 5 to 7, the lens 11 integrally has a pair of legs 12 provided on both outer sides in the width direction (direction X). The lens 11 also integrally has protrusions 13 so formed as to protrude from the pair of legs 12 rearward (along arrow Y2) in the anteroposterior direction (direction Y) and lens-side mounting portions 14 so formed as to protrude from ends of the protrusions 13 outward in the width direction (direction X), as shown in FIGS. 5 and 6. The pair of lens-side mounting portions 14 are provided for mounting the lens 11 on the housing-side mounting portions 6 of the front housing 3a (see FIG. 3). Lens-side boss receiving holes 14a receiving the housing-side bosses 6a of the upper mounting portions 6b of the housing-side mounting portions 6 for positioning the lens 11 with respect to the front housing 3a are provided on upper portions of the lens-side mounting portions 14. Further, screw receiving holes 14b are provided on lower portions of the lens-side mounting portions 14 on positions corresponding to the threaded holes 6c of the lower mounting portions 6d of the housing-side mounting portions 6. The lens-side boss receiving holes 14a are examples of the "second boss receiving hole" in the present invention.

According to this embodiment, the pair of protrusions 13 are integrally provided with board pressing portions 15 so formed as to press portions around both corners of the lower side (along arrow Z2 in FIG. 3) of the wiring board 31 (see FIG. 3) described later frontward and protrude from between the legs 12 and the lens-side mounting portions 14 inward in the width direction (direction X) respectively, as shown in FIGS. 5 and 6. In other words, the pair of board pressing portions 15 are provided for mounting the wiring board 31 (see FIG. 3). The board pressing portions 15 have lens-side bosses 15a so provided as to protrude toward the front surface (along arrow Y1) of the front housing 3a (see FIG. 3) for temporarily fixing the wiring board 31 (see FIG. 3), as shown in FIG. 6. The board pressing portions 15 are provided on positions separating from the lens-side mounting portions 14 of the legs 12 frontward at a prescribed interval. The board pressing portions 15 are examples of the "first pressing portion" in the present invention, and the lens-side bosses 15a are examples of the "first boss" in the present invention.

As shown in FIG. 6, a light guide portion 18 formed by a W-shaped vertical light guide portion 16 and a horizontal light guide portion 17 is provided between the pair of legs 12 of the lens 11. The light guide portion 18 is an example of the "transmitting portion" in the present invention. A frontward reflecting portion 19 for reflecting light emitted from the LED 32 (see FIG. 8) and received from below frontward (along arrow Y1) in the anteroposterior direction (direction Y) is provided on the junction between the vertical light guide portion 16 and the horizontal light guide portion 17. The frontward reflecting portion 19 is constituted of an inclined surface 19a obliquely inclined by 45° frontward (along arrow Y1). As shown in FIG. 5, the display portion 20 for displaying the light from the LED 32 (see FIG. 8) is provided on the front end of the horizontal light guide portion 17. The front end surface of the display portion 20 has a fine corrugated shape.

According to this embodiment, an LED arrangement portion 21 for arranging the LED 32 (see FIG. 8) is provided on a recessed portion at the center of the W-shaped vertical light guide portion 16, as shown in FIGS. 5 to 7. The vertical light guide portion 16 has a pair of flat portions 22 so formed as to extend from the LED arrangement portion 21 toward both width-directional outer sides. Further, the vertical light guide portion 16 is provided with a pair of upward reflecting portions 23 having inclined portions 23a so formed as to obliquely outwardly extend upward from the pair of flat portions 22 up to portions around ends of the frontward reflecting portion 19. The upward reflecting portions 23 are provided for reflecting the light from the LED 32 (see FIG. 8) upward. The inclined portions 23a of the upward reflecting portions 23 have stepped shapes formed by step portions 23b obliquely outwardly extending upward to some extent (at an angle of several degrees) with respect to the vertical direction and step portions 23c obliquely outwardly extending upward to some extent (at an angle of several degrees) with respect to the horizontal direction, as shown in FIG. 7. Further, the step portions provided between the innermost step portions 23d (closer to the flat portions 22) and the outermost step portions 23e (closer to the legs 12) are so formed as to have the same shape. Thus, the display portion 20 displays the light reflected by the upward reflecting portions 23 as light spots by the number of the step portions 23b.

Figure 8:
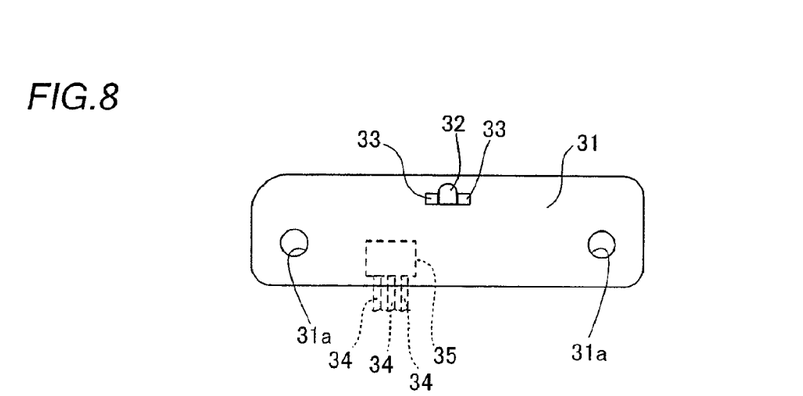
FIG. 8 is a front elevational view showing the structure of a board portion of the indicator unit according to the embodiment shown in FIG. 3.
Figure 9:
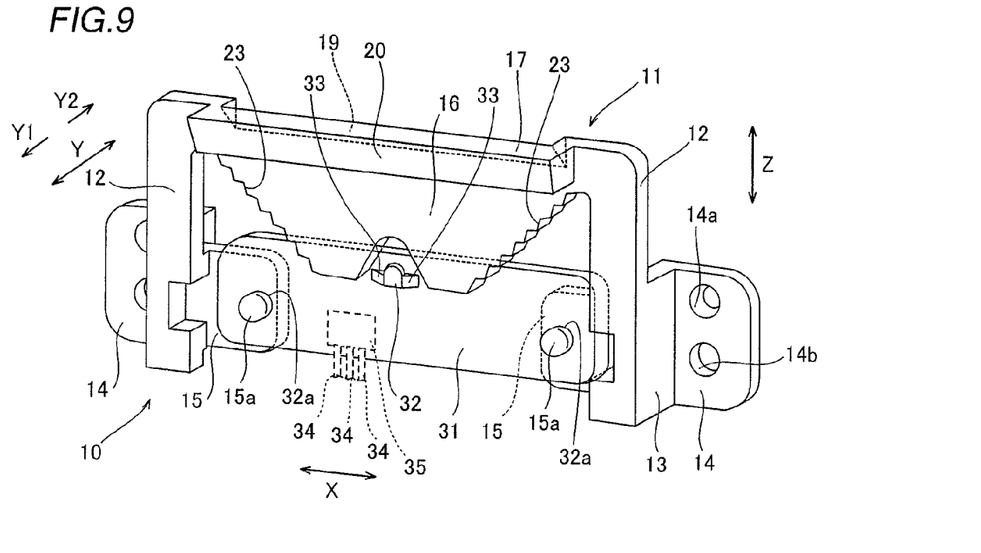
FIG. 9 is a perspective view showing the structure of the indicator unit according to the embodiment shown in FIG. 3.
Figure 10:
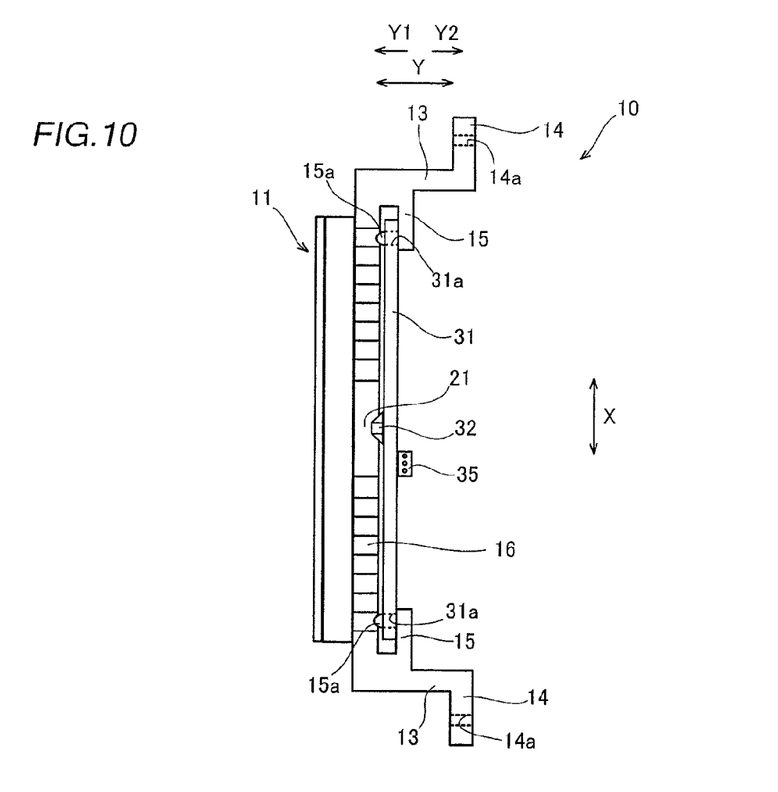
FIG. 10 is a bottom plan view showing the structure of the indicator unit according to the embodiment shown in FIG. 3.

As shown in FIGS. 8 and 9, the LED 32 is mounted on a substantially central portion of the front side (in the depth direction (along arrow Y1 in FIG. 9)) of the wiring board 31. The LED 32 is an example of the "light source portion" in the present invention. A pair of solder portions 33 are provided for electrically connecting the LED 32 to the wiring board 31. As shown in FIGS. 8 and 9, lead wires 34 and a socket 35 are mounted on the rear surface (along arrow Y2 in FIG. 9) of the wiring board 31, for supplying power to the LED 32. As shown in FIGS. 8 to 10, board-side boss receiving holes 31a receiving the lens-side bosses 15a (see FIGS. 9 and 10) of the board pressing portions 15 (see FIGS. 9 and 10) of the lens 11 are provided around both ends of the wiring board 31. The board-side boss receiving holes 31a are examples of the "first boss receiving hole" in the present invention.

The procedure for mounting the indicator unit 10 on the front housing 3a of the television set 1 with a disk unit according to the embodiment of the present invention is now described with reference to FIGS. 9 to 12.

Figure 11:
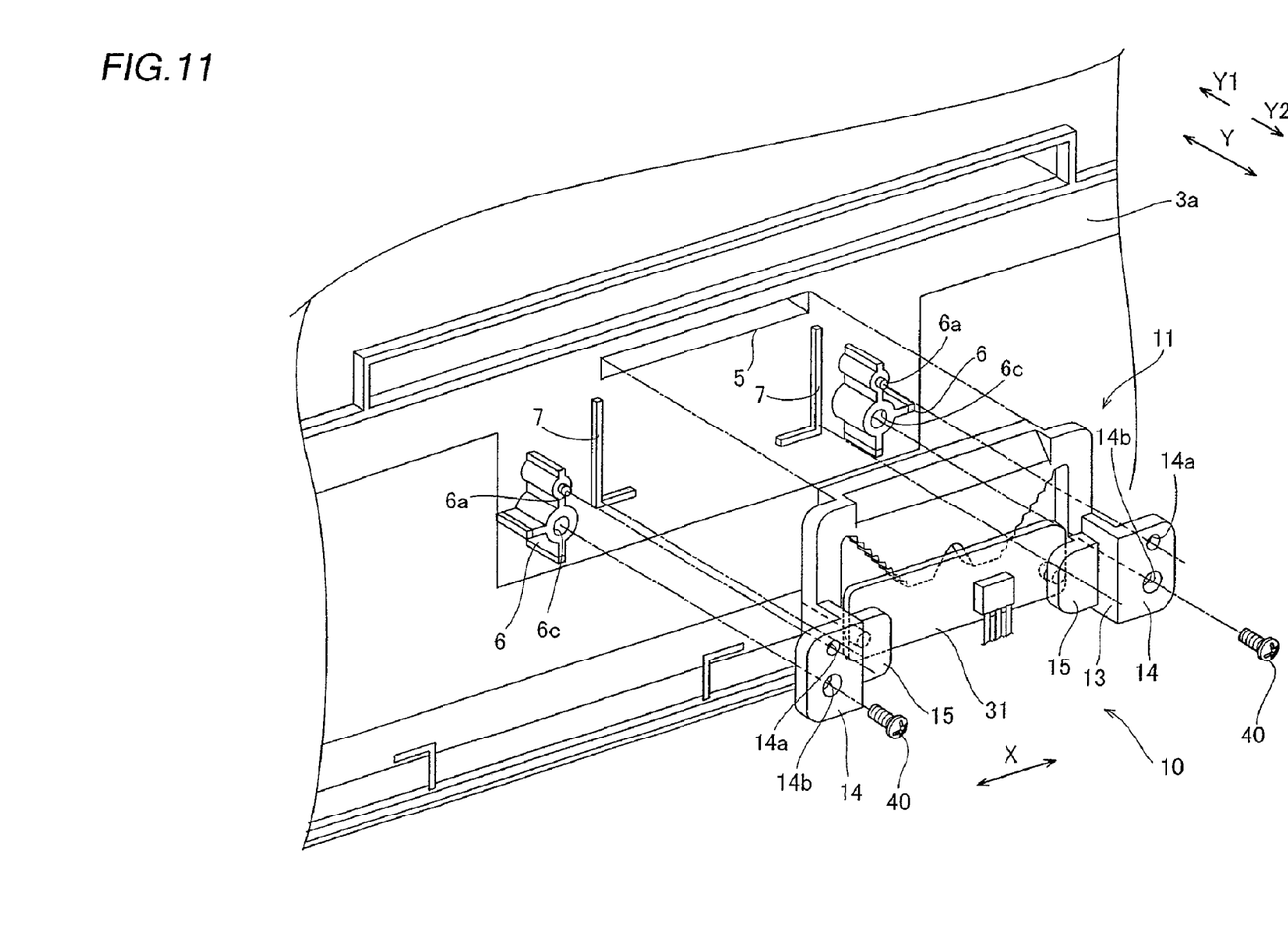
FIG. 11 is an exploded perspective view showing a method of assembling the front housing and the indicator unit of the television set with a disk unit according to the embodiment shown in FIG. 1.

First, the pair of lens-side bosses 15a of the pair of board pressing portions 15 of the lens 11 are inserted into the pair of board-side boss receiving holes 31a of the wiring board 31 respectively thereby temporarily fixing the wiring board 31 to the lens 11, as shown in FIGS. 9 to 11. More specifically, the wiring board 31 is arranged on the front side (along arrow Y1) of the board pressing portions 15 of the lens 11 and on the rear side (along arrow Y2) of the W-shaped vertical light guide portion 16 when mounted on the lens 11, as shown in FIG. 10. In other words, the wiring board 31 is arranged between the board pressing portions 15 and the vertical light guide portion 16 in plan view, while the board-side boss receiving holes 31a thereof receive the lens-side bosses 15a of the board pressing portions 15. Thus, the vertical light guide portion 16 inhibits the wiring board 31 from moving in a direction to disengage from the lens-side bosses 15a of the board pressing portions 15, whereby the wiring board 31 is temporarily fixed to the lens 11. The wiring board 31 is positioned with respect to the lens 11 by receiving the lens-side bosses 15a of the board pressing portions 15 in the board-side boss receiving holes 31a thereof, whereby the LED 32 is arranged at the center of the LED arrangement portion 21 provided at the center of the W-shaped vertical light guide portion 16 of the lens 11, as shown in FIG. 10.

Figure 12:
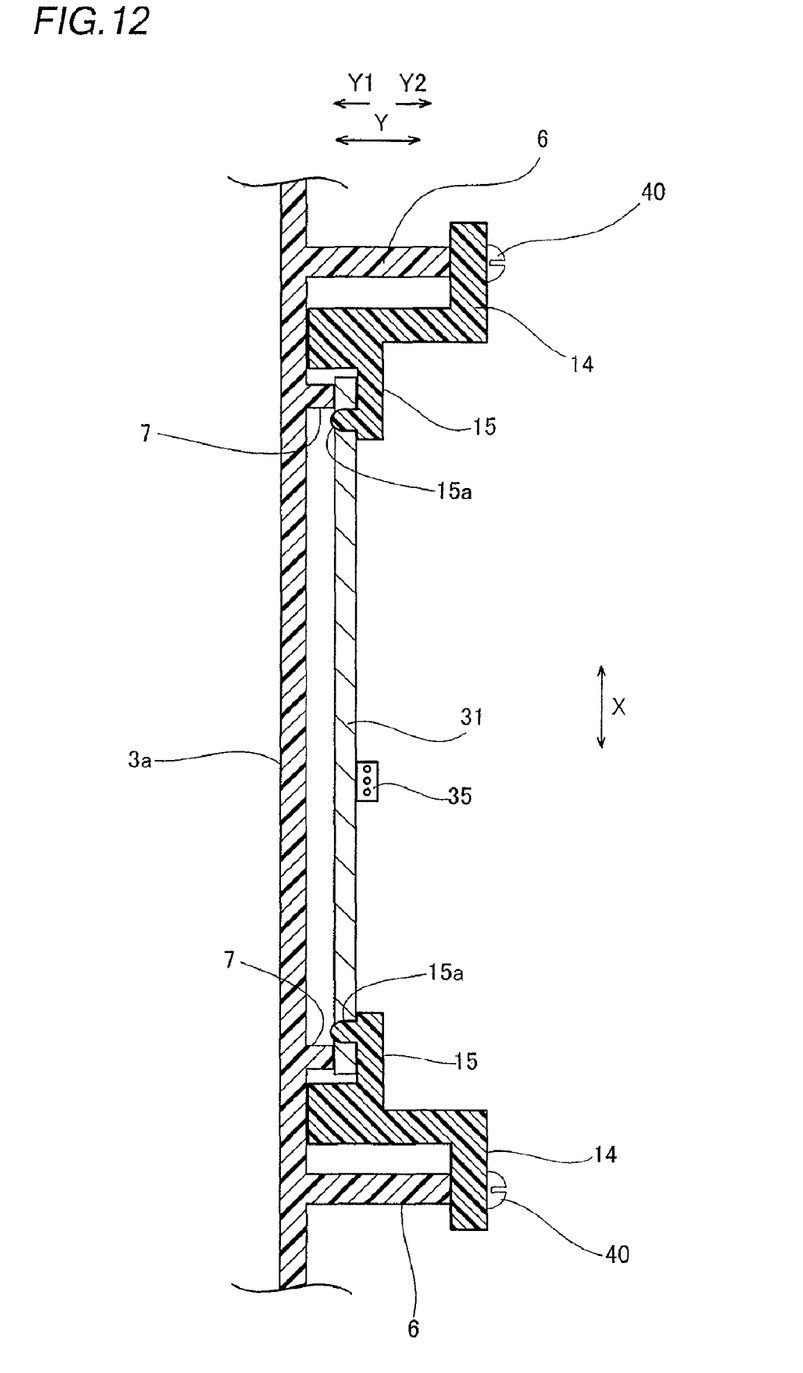
FIG. 12 is a sectional view taken along the line 100-100 in FIG. 3 for illustrating the structures of the front housing and the indicator unit of the television set with a disk unit according to the embodiment shown in FIG. 1.

Then, the display portion 20 of the lens 11 is inserted into the display portion slot 5 of the front housing 3a, while the housing-side bosses 6a of the pair of housing-side mounting portions 6 of the front housing 3a are inserted into the lens-side boss receiving holes 14a of the pair of lens-side mounting portions 14 of the lens 11 respectively at the same time. Thus, the lens 11 and the wiring board 31 are positioned with respect to the front housing 3a. At this time, the pair of L-shaped ribs 7 of the front housing 3a come into contact with portions along both sides of the front surface of the wiring board 31 and portions around side edges of the lower end thereof, as shown in FIG. 3. Thus, the ribs 7 press the wiring board 31 rearward (along arrow Y2 in FIG. 11). Then, screws 40 are inserted into the screw receiving holes 14b of the pair of lens-side mounting portions 14 of the lens 11, and clamped to the pair of threaded holes 6c of the front housing 3a. Thus, the indicator unit 10 is mounted on the front housing 3a while the ribs 7 of the front housing 3a press the wiring board 31 rearward (along arrow Y2) and the board pressing portions 15 of the lens 11 press the corners, pressed by the pair of ribs 7, of the wiring board 31 frontward (along arrow Y1) so that both of the front and rear surfaces of the wiring board 31 are pressed, as shown in FIG. 12. Consequently, the wiring board 31 held between the ribs 7 of the front housing 3a and the board pressing portions 15 of the lens 11 can be fixed with no screw members. Thus, the indicator unit 10 is mounted on the front housing 3a.

According to this embodiment, as hereinabove described, the lens 11 is so mounted on the front housing 3a that the board pressing portions 15 of the lens 11 press the rear surface of the wiring board 31 frontward (along arrow Y1) while the ribs 7 of the front housing 3a press the front surface of the wiring board 31 rearward (along arrow Y2) for holding and fixing the wiring board 31 of the indicator unit 10 so that the wiring board 31 can be mounted on the front housing 3a without dedicated screw members for fixing the wiring board 31, whereby the number of components can be reduced. Further, the wiring board 31 is held and fixed by the board pressing portions 15 of the lens 11 and the ribs 7 of the front housing 3a while the LED 32 of the wiring board 31 is positioned with respect to the lens 11, whereby the wiring board 31 can be fixed while correctly keeping the positional relation between the lens 11 and the LED 32 of the wiring board 31. Thus, the display performance of the indicator unit 10 can be prevented from reduction resulting from positional deviation between the LED 32 and the lens 11.

According to this embodiment, as hereinabove describes, the ribs 7 of the front housing 3a are so integrally formed on the front housing 3a that the number of components can be reduced as compared with a case of providing the ribs 7 separately from the front housing 3a.

According to this embodiment, as hereinabove described, the lens 11 has the light guide portion 18 for transmitting the light from the LED 32 and the ribs 7 of the front housing 3a are arranged on positions not overlapping the light guide portion 18 in front elevational view, whereby the ribs 7 of the front housing 3a can be inhibited from blocking the light from the LED 32 when the same is transmitted through the light guide portion 18 of the lens 11. Thus, the display performance of the display portion 20 of the indicator unit 10 for the light from the LED 32 can be prevented from reduction resulting from the ribs 7.

According to this embodiment, as hereinabove described, the ribs 7 of the front housing 3a are L-shaped in front elevational view and so arranged as to press two sides around the corners of the wiring board 31 so that the L-shaped ribs 7 pressing the two sides of the wiring board 31 can press the width-directional (X-directional) sides and the lower side of the wiring board 31, whereby the wiring board 31 can be more stably fixed. Further, the ribs 7 are so formed as to press portions around the corners of the wiring board 31, thereby pressing the wiring board 31 on positions avoiding wires etc. of the wiring board 31.

According to this embodiment, as hereinabove described, the board pressing portions 15 of the lens 11 are provided with the lens-side bosses 15a for regulating the position of the wiring board 31 while the wiring board 31 is provided with the board-side boss receiving holes 31a for receiving the lens-side bosses 15a of the lens 11 so that the LED 32 of the wiring board 31 is positioned with respect to the lens 11 by inserting the lens-side bosses 15a of the lens 11 into the board-side boss receiving holes 31a of the wiring board 31, whereby the wiring board 31 can be fixed while the LED 32 thereof is positioned with respect to the lens 11.

According to this embodiment, as hereinabove described, the front housing 3a is further provided with the housing-side mounting portions 6 for mounting the lens 11 while the housing-side mounting portions 6 of the front housing 3a have the housing-side bosses 6a for regulating the position of the lens 11 and the lens 11 has the lens-side boss receiving holes 14a receiving the housing-side bosses 6a of the housing-side mounting portions 6, whereby the lens 11 can be easily positioned with respect to the front housing 3a by inserting the housing-side bosses 6a of the housing-side mounting portions 6 of the front housing 3a into the lens-side boss receiving holes 14a of the lens-side mounting portions 14 of the lens 11 when mounting the lens 11 on the front housing 3a. Thus, the operation of mounting the lens 11 on the front housing 3a can be prevented from complication.

According to this embodiment, as hereinabove described, the housing-side mounting portions 6 of the front housing 3a further have the threaded holes 6c and the lens 11 is mounted on the front housing 3a by clamping the screws 40 to the threaded holes 6c of the housing-side mounting portions 6 of the front housing 3a while the housing-side bosses 6a of the housing-side mounting portions 6 of the front housing 3a are inserted into the lens-side boss receiving holes 14a of the lens-side mounting portions 14 of the lens 11, whereby the lens 11 can be firmly fixed to the front housing 3a while positioning the lens 11 with respect to the front housing 3a through the lens-side boss receiving holes 14a of the lens-side mounting portions 14 of the lens 11 and the housing-side bosses 6a of the housing-side mounting portions 6 of the front housing 3a.

According to this embodiment, as hereinabove described, the board pressing portions 15 of the lens 11 are so formed as to press regions corresponding to the portions around the corners of the wiring board 31 pressed by the L-shaped ribs 7 so that the board pressing portions 15 and the ribs 7 of the lens 11 can hold the portions around both corners on the lower side of the wiring board 31, whereby the wiring board 31 can be fixed in a stable state.

According to this embodiment, as hereinabove described, the pair of board pressing portions 15 of the lens 11 are provided on right and left portions through the light guide portion 18 so that the pair of board pressing portions 15 of the lens 11 can press two horizontally separating portions of the wiring board 31, whereby the wiring board 31 can be fixed in a more stable state.

According to this embodiment, as hereinabove described, the pair of ribs 7 are provided on positions corresponding to the pair of board pressing portions 15 respectively so that the pair of board pressing portions 15 and the pair ribs 7 hold and fix the wiring board 31, whereby the wiring board 31 held between the two board pressing portions 15 and the two ribs 7 can be fixed in a more stable state.

According to this embodiment, as hereinabove described, the pair of ribs 7 having horizontally symmetrical L-shapes in front elevational view are so formed as to press two sides around the right and left corners of the wiring board 31 respectively so that the pair of ribs 7 can press the two sides around both corners on the lower side of the wiring board 31, whereby the wiring board 31 can be fixed in a more stable state.

According to this embodiment, as hereinabove described, the pair of board pressing portions 15 are integrally formed on the pair of legs 12 integrally provided on the light guide portion 18 so that the light guide portion 18, the pair of legs 12 and the pair of board pressing portions 15 of the lens 11 can be integrally formed, whereby the number of components can be reduced as compared with a case of providing the light guide portion 18 an the pair of board pressing portions 15 separately from each other.

According to this embodiment, as hereinabove described, the lens 11 is provided with the pair of lens-side mounting portions 14 mounted on the pair of housing-side mounting portions 6 of the housing 3 and integrally formed on the pair of legs 12 so that the light guide portion 18, the pair of legs 12 and the pair of lens-side mounting portions 14 of the lens 11 can be integrally formed, whereby the number of components can be reduced as compared with a case of providing the light guide portion 18 and the pair of lens-side mounting portions 14 separately from each other.

According to this embodiment, as hereinabove described, the pair of lens-side mounting portions 14 are so formed as to protrude rearward with respect to the surfaces of the pair of legs 12 while the pair of board pressing portions 15 are provided on positions separating from the lens-side mounting portions 14 of the legs 12 frontward at the prescribed interval so that the board pressing portions 15 pressing the wiring board 31 and the lens-side mounting portions 14 for mounting the lens 11 on the housing 3 can be arranged on positions anteroposteriorly separating from each other, whereby the wiring board 31 pressed by the board pressing portions 15 and the lens-side mounting portions 14 can be inhibited from interfering with each other.

Although the present invention has been described and illustrated in detail, it is clearly understood that the same is by way of illustration and example only and is not to be taken by way of limitation, the spirit and scope of the present invention being limited only by the terms of the appended claims.

For example, while the aforementioned embodiment is applied to the television set 1 with a disk unit employed as the exemplary television set comprising the indicator unit, the present invention is not restricted to this but is also applicable to an image display, a recording/reproducing apparatus, a stereo or a PC (personal computer), so far as the indicator unit can be arranged thereon.

While the ribs 7 provided on the housing 3 for pressing the wiring board 31 are L-shaped for coming into contact with two sides of the wiring board 31 in the aforementioned embodiment, the present invention is not restricted to this but the ribs 7 may alternatively be so shaped as to come into contact with portions, provided with no wires, around the outer periphery of the wiring board 31. If rendered U-shaped for coming into contact with the upper side, the width-directional sides and the lower side of the wiring board 31, for example, the ribs 7 of the housing 3 can press the wiring board rearward by coming into contact with the upper side, the width-directional sides and the lower side thereof, whereby the wiring board 31 can be more stably fixed.

While the screws 40 are employed as fasteners for fixing the lens 11 and the housing 3 to each other in the aforementioned embodiment, the present invention is not restricted to this but the lens 11 and the housing 3 may alternatively be fixed to each other by a fastening method, other than fitting with the screws 40, employing rivets or the like.

What is claimed is:

1. A structure for mounting an indicator unit on an electronic apparatus, comprising:
    an indicator unit including a wiring board mounted with a light source portion and a lens member transmitting light from said light source portion; and
    a housing of an electronic apparatus mounted with said indicator unit, wherein
    said lens member has a first pressing portion pressing a first surface of said wiring board toward a first direction,
    said housing includes a second pressing portion pressing a second surface of said wiring board toward a second direction opposite to said first direction,
    said wiring board is fixed by mounting said lens member on said housing so that said wiring board is held between said first pressing portion of said lens member and said second pressing portion of said housing while said light source portion of said wiring board is positioned with respect to said lens member,
    said first pressing portion of said lens member is provided with a first boss for regulating the position of said wiring board,
    said wiring board has a first boss receiving hole for receiving said first boss of said lens member, and
    said light source portion of said wiring board is positioned with respect to said lens member by inserting said first boss of said lens member into said first boss receiving hole of said wiring board.

2. The structure for mounting an indicator unit on an electronic apparatus according to claim 1, wherein
    said second pressing portion of said housing is constituted of a rib integrally formed on said housing.

3. The structure for mounting an indicator unit on an electronic apparatus according to claim 2, wherein
    said lens member has a transmitting portion for transmitting said light from said light source portion, and
    said rib constituting said second pressing portion of said housing is arranged on a position not overlapping said transmitting portion in front elevational view.

4. The structure for mounting an indicator unit on an electronic apparatus according to claim 3, wherein
    a pair of said first pressing portions of said lens member are provided on right and left portions through said transmitting portion.

5. The structure for mounting an indicator unit on an electronic apparatus according to claim 4, wherein
    a pair of said ribs are provided on positions corresponding to said pair of first pressing portions, and
    said wiring board is so held between said pair of first pressing portions and said pair of ribs as to be fixed.

6. The structure for mounting an indicator unit on an electronic apparatus according to claim 5, wherein
    said pair of ribs have horizontally symmetrical L shapes in front elevational view, and are so formed as to press two sides around the right and left corners of said wiring board respectively.

7. The structure for mounting an indicator unit on an electronic apparatus according to claim 2, wherein
    said rib constituting said second pressing portion of said housing is L-shaped in front elevational view, and so arranged as to press two sides around corners of said wiring board.

8. The structure for mounting an indicator unit on an electronic apparatus according to claim 7, wherein
    said first pressing portion of said lens member is so formed as to press regions corresponding to portions around said corners of said wiring board pressed by said L-shaped rib of said housing.

9. The structure for mounting an indicator unit on an electronic apparatus according to claim 4, wherein
    said lens member further includes a pair of legs so integrally formed as to extend downward from both horizontal ends of said transmitting portion, and
    said pair of first pressing portions are integrally formed on said pair of legs respectively.

10. The structure for mounting an indicator unit on an electronic apparatus according to claim 9, wherein
    said housing further includes a pair of mounting portions for mounting said lens member, and
    said lens member further includes a pair of lens-side mounting portions mounted on said pair of mounting portions of said housing and integrally formed on said pair of legs.

11. The structure for mounting an indicator unit on an electronic apparatus according to claim 10, wherein
    said pair of lens-side mounting portions of said lens member are so formed as to protrude oppositely to said first direction with respect to the surfaces of said pair of legs, and
    said pair of first pressing portions are formed on positions separating from said lens-side mounting portions of said legs at a prescribed interval in said first direction.

12. The structure for mounting an indicator unit on an electronic apparatus according to claim 1, wherein
    said housing further includes a mounting portion for mounting said lens member,
    said mounting portion of said housing has a second boss for regulating the position of said lens member, and
    said lens member has a second boss receiving hole receiving said second boss of said mounting portion of said housing.

13. The structure for mounting an indicator unit on an electronic apparatus according to claim 12, wherein
    said mounting portion of said housing further has a threaded hole, and
    said lens member is mounted on said housing by clamping a screw member to said threaded hole of said housing while inserting said second boss of said mounting portion of said housing into said second boss receiving hole of said lens member.

14. The structure for mounting an indicator unit on an electronic apparatus according to claim 1, wherein
    said electronic apparatus is a television set integrally including a disk unit, and
    said indicator unit is mounted on said housing of said television set, and employed as an indicator of said disk unit.

15. A television set comprising:
    a display portion displaying images;
    an indicator unit including a wiring board mounted with a light source portion and a lens member transmitting light from said light source portion; and
    a housing mounted with said indicator unit, wherein
    said lens member has a first pressing portion pressing a first surface of said wiring board toward a first direction, said housing includes a second pressing portion pressing a second surface of said wiring board toward a second direction opposite to said first direction, said wiring board is fixed by mounting said lens member on said housing so that said wiring board is held between said first pressing portion of said lens member and said second pressing portion of said housing while said light source portion of said wiring board is positioned with respect to said lens member, said second pressing portion of said housing is constituted of a rib integrally formed on said housing, and said rib constituting said second pressing portion of said housing is L-shaped in front elevation view, and so arranged as to press two sides around corners of said wiring board.

16. The television set according to claim 15, wherein said lens member has a transmitting portion for transmitting said light from said light source portion, and said rib constituting said second pressing portion of said housing is arranged on a position not overlapping said transmitting portion in front elevational view.

17. The television set according to claim 15, wherein said first pressing portion of said lens member is so formed as to press regions corresponding to portions around said corners of said wiring board pressed by said L-shaped rib of said housing.

* * * * *